(12) United States Patent
Andersson et al.

(10) Patent No.: US 6,342,192 B1
(45) Date of Patent: Jan. 29, 2002

(54) DEVICE FOR CLEANING EXHAUST FUMES

(75) Inventors: Sören Andersson, Liden; Magali Boutonnet Kizling, Täby, both of (SE)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 08/313,166

(22) PCT Filed: Apr. 6, 1993

(86) PCT No.: PCT/SE93/00294

§ 371 Date: Dec. 5, 1994

§ 102(e) Date: Dec. 5, 1994

(87) PCT Pub. No.: WO93/20937

PCT Pub. Date: Oct. 28, 1993

(30) Foreign Application Priority Data

Apr. 10, 1992 (SE) .............................................. 9201158

(51) Int. Cl.$^7$ ...................... B01J 27/224; B01D 53/34; F01N 3/00
(52) U.S. Cl. .................... 423/213.5; 502/178; 502/439; 502/527.24; 422/177; 422/180
(58) Field of Search ................................ 502/178, 439, 502/527, 527.24; 423/213.5; 422/177, 180

(56) References Cited

U.S. PATENT DOCUMENTS

| | | | |
|---|---|---|---|
| 4,532,228 A | * 7/1985 | Golino et al. ............... | 502/261 |
| 4,812,434 A | 3/1989 | Poulmann et al. .......... | 502/178 |
| 4,914,070 A | 4/1990 | Ledoux et al. .............. | 502/178 |
| 4,940,684 A | * 7/1990 | Okutani et al. ............. | 502/178 |
| 5,196,389 A | * 3/1993 | Dubots ....................... | 502/178 |

FOREIGN PATENT DOCUMENTS

| | | |
|---|---|---|
| EP | 0 432 534 B1 | 3/1994 |
| WO | WO 90/05579 | 5/1990 |

OTHER PUBLICATIONS

Abstract JP 63248446 Oct. 14, 1988.
Abstract JP 2180641 Jul. 13, 1990.

* cited by examiner

*Primary Examiner*—Walter D. Griffin
(74) *Attorney, Agent, or Firm*—Luedeka, Neely & Graham PC

(57) ABSTRACT

The invention relates to a catalyst for cleaning the exhaust gases from internal combustion engines, especially diesel engines, comprising a monolithic body having longitudinally extending, open throughchannels coated with a surface-enlarging washcoat layer which contains one or more catalytically active precious metals. In order to reduce the tendency of the catalyst to oxidize and absorb (be enriched with) sulphur dioxide, the washcoat layer of the catalyst is based on silicon carbide and is substantially free from aluminum oxide. A method for preparing the catalyst, the use of the catalyst, as well as an exhaust gas cleaning system and a motor vehicle equipped with the catalyst, are also disclosed.

15 Claims, 1 Drawing Sheet

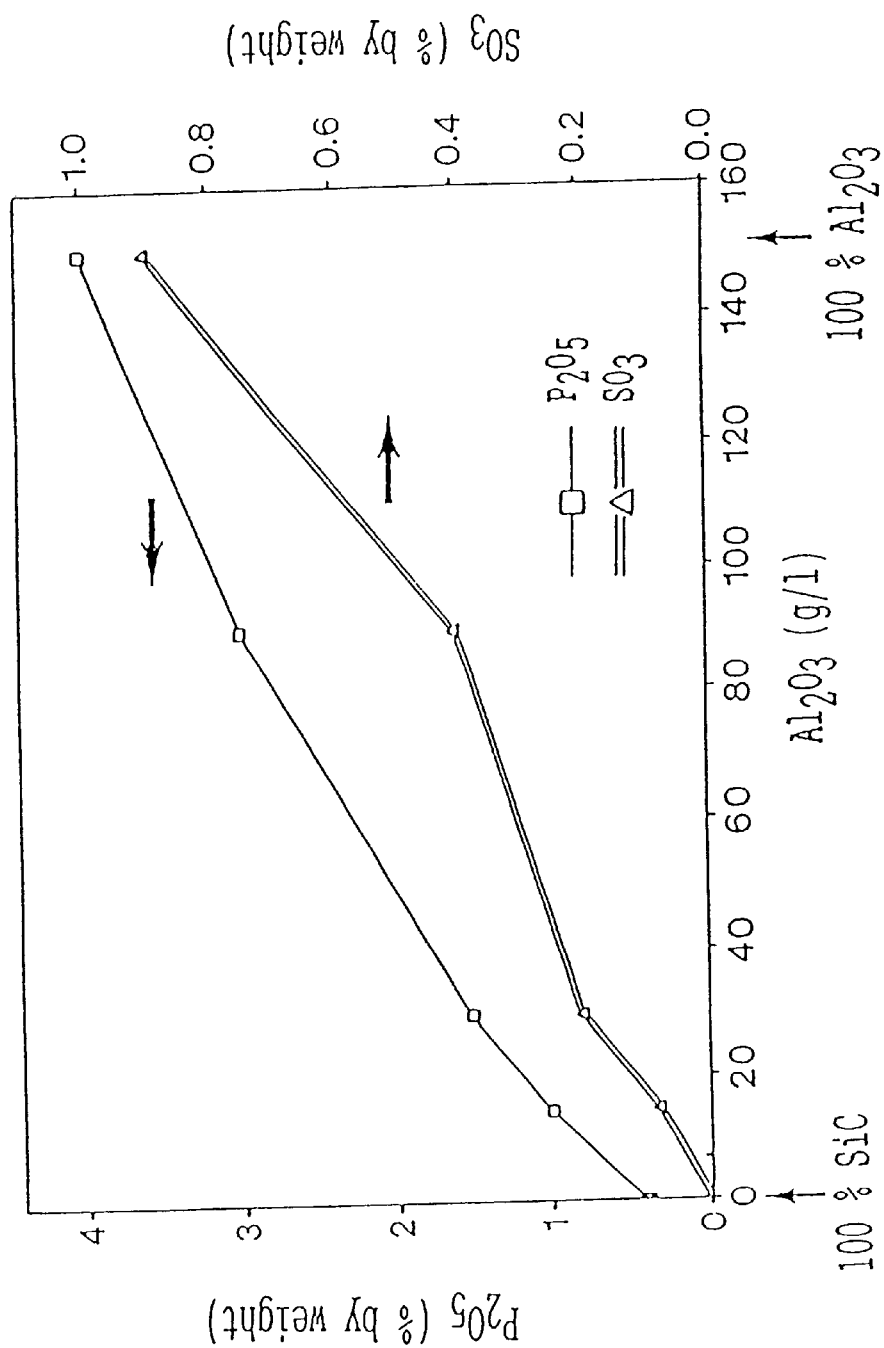

DEVICE FOR CLEANING EXHAUST FUMES

FIELD OF THE INVENTION

This invention relates to a catalyst for cleaning exhaust gases from internal combustion engines, especially diesel engines. The catalyst comprises a monolithic body having longitudinally extending, open throughchannels coated with a surface-enlarging washcoat layer which is based on silicon carbide and one or more catalytically active precious metals. The invention also concerns a method for preparing the catalyst, the use of the catalyst, as well as an exhaust gas cleaning system and a motor vehicle equipped with the catalyst.

DESCRIPTION OF THE PRIOR ART

Exhaust gases from diesel engines contain large amounts of soot particles, largely consisting of hydrocarbons, sulphuric acid and water in varying proportions, as well as residues from lubricating oil and engine wear. Usually, the exhaust gases also contain sulphur dioxide. Many systems for cleaning diesel exhaust gases have a particle filter, which increases the pressure drop in the exhaust system. In addition, fairly complicated techniques are needed to avoid clogging of the filter.

Exhaust gas cleaning systems with no particle filter require the presence of a catalyst able to oxidise the hydrocarbon compounds in the particles to carbon dioxide. As is well-known, use can be made of a catalyst in the form of a monolithic body having throughchannels whose walls are coated with a surface-enlarging washcoat layer which is formed of or based on aluminium oxide and is impregnated with precious metals, e.g. platinum and/or palladium. However, such a catalyst also oxidises a substantial amount of the sulphur dioxide to sulphur trioxide, which is more corrosive as well as more harmful to the environment. At low temperatures, sulphur dioxide and sulphur trioxide may, in addition, be absorbed by the catalyst, to be desorbed later on when the temperature of the exhaust gases rises. When the temperature of the catalyst increases rapidly, the amount of sulphur dioxide and sulphur trioxide desorbed may be considerable. Among other things, this manifests itself as an increase in the emission of particles from the catalyst. A further problem arises when inorganic residues of lubricating oil additives, such as compounds of phosphorus, zinc, calcium, magnesium and sulphur, are present in the exhaust gases and are enriched in the catalyst, thereby considerably reducing the catalytic activity in course of time.

EP-B-0 432 534 discloses a monolithic catalyst for cleaning diesel exhaust gases. This catalyst has a surface-enlarging layer containing aluminium oxide, titanium dioxide and silicon dioxide. As catalytically active substance, use is made not only of precious metals, but also of a vanadium compound stated to reduce the oxidation tendencies of $SO_2$ and NO.

PCT Publication WO 90/05579 teaches an oxidation catalyst containing precious metals on a carrier of silicon dioxide, titanium dioxide, zirconium dioxide or zeolite, stated to reduce the sensitivity of the catalyst to sulphur pollutants in the exhaust gases from fossil fuels.

Further, it is known to prepare porous catalyst bodies by sintering silicon carbide into monoliths. This technique is described e.g. in Derwent Abstracts WPI Acc. No. 90257450/34, JP Kokai 2-180641. The purpose is to speed up the increase of the catalyst temperature up to running temperature. It is stated that a surface layer of silicon dioxide of sustained strength can be produced by treatment under oxidising conditions. This catalyst has no surface-enlarging washcoat layer.

U.S. Pat. No. 4,812,434 discloses a homogeneous catalyst consisting of 50–95% by weight of SiC and 5–50% by weight of an alloy made up of silicon and one or more of the following metals: Cu, Fe, Co, Ni, Zr, V, Mo, Mn, Zn, Ag, Pt and Pd. The alloy acts as catalytically active material and is activated by oxidation or chemical treatment. This monolith has been prepared from the indicated material for improved thermal stability and increased chemical resistance and mechanical strength. Further, the fact that the catalytic material is evenly distributed over the whole cross-section of the catalyst is seen as an advantage. Thus, the U.S. specification relates to a catalyst having improved mechanical and thermal properties, being more available in terms of economy, and/or having improved long-term strength in operation.

There is a need for an effective oxidation catalyst which is suitable for cleaning diesel exhaust gases and is comparatively passive in respect of oxidation and accumulation (absorption) of sulphur dioxide, and which is resistant to accumulation of inorganic residues of lubricating oil additives, such as contaminants of phosphorus, zinc, calcium, magnesium and sulphur, especially to enrichment of phosphorus. Also, the absorption of sulphur dioxide and sulphur trioxide in the catalyst should be minimised.

SUMMARY OF THE INVENTION

As mentioned earlier, exhaust gas cleaning involves a considerable problem residing in the oxidation, in prior-art catalysts, of sulphur dioxide to sulphur trioxide. There is also the problem of inorganic residues of lubricating oil additives accumulating in the catalysts. One object of the present invention is, therefore, to obviate these problems in connection with a catalyst whose carrier is a monolithic body having longitudinally extending, open throughchannels which have a surface-enlarging washcoat layer impregnated with the active catalyst material. According to the invention, this object is achieved by the washcoat layer being formed of a substantially aluminium-oxide-free layer of finely distributed silicon carbide and impregnated with an effective amount of one or more catalytically active precious metals. Preferably, the content of silicon carbide in the washcoat layer is at least 90% by weight.

The characteristic features of the invention are recited in appended claim 1, and especially preferred embodiments are defined in the appended subclaims.

BRIEF DESCRIPTION OF THE DRAWING

The drawing is a graphical representation of $SO_3$ and $P_2O_5$ absorbtion tendencies of various catalysts as a function of $Al_2O_3$ content of the catalysts.

DETAILED DESCRIPTION OF THE INVENTION

Conveniently, the content of silicon carbide in the washcoat layer exceeds about 90% by weight and may be up to 100% by weight. The silicon carbide suitably is present in the form of particles, preferably having a diameter of from about 0.02 μm to about 20 μm, the especially preferred diameter ranging from about 0.05 μm to about 5 μm. Preferably, these particles have so small points of contact with one another that the effective particle surface substantially equals that of the same amount of free particles. The catalyst suitably contains from about 15 g to about 300 g of washcoat per liter, preferably from about 50 g to about 200 g. Conveniently, the effective surface of the catalyst is from about 15 m²/l to about 30,000 m²/l, preferably from about 250 m²/l to about 10,000 m²/l. The volume is the total outer volume of the catalyst.

The thickness of the washcoat layer may vary within wide limits, e.g. from about 0.5 μm to about 100 μm, also in one and the same channel. Apart from silicon carbide, the washcoat layer may contain metal compounds, such as oxides of alkaline-earth metals (e.g. magnesium or calcium), oxides of rare earth metals (e.g. cerium, lanthanum or thorium), oxides of transition metals (e.g. iron, nickel, zinc, chromium, tungsten, cobalt, niobium or molybdenum), oxides of metals from the group IV B (e.g. titanium or zirconium), and oxides of semimetals (e.g. tin or germanium). However, the washcoat layer should be substantially free from aluminum oxide or at any rate not contain more than about 10% thereof, since the higher the content of aluminium oxide, the higher the tendency to oxidation of sulphur dioxide to sulphur trioxide.

Conveniently, the catalyst contains from about 0.1 g to about 5 g of catalytically active precious metals per liter, preferably from about 0.3 g to about 2 g. For instance, the precious metals may include one or more of platinum, palladium, rhodium and iridium. Preferably, the precious metal content essentially consists of platinum, palladium or mixtures thereof.

In accordance with prior-art techniques, the monolithic body may have been prepared from a suitable metal or a ceramic material, e.g stainless steel or cordierite.

The invention also concerns a method for preparing the catalyst described above. In the method, a monolithic body is first coated with a washcoat layer, and catalytically active precious metals are then applied to the washcoat layer. According to the invention, the washcoat layer should be formed of silicon carbide in an amount of at least about 90% by weight, based on the washcoat layer, exclusive of the catalytically active precious metal or metals.

The monolithic body may be coated with the washcoat layer in known manner, e.g. by impregnation with a washcoat slurry, drying and calcination, in which case the washcoat slurry according to the invention is formed substantially of silicon carbide particles. The precious metals may also be applied in known manner, e.g. by impregnating the coated monolith with a solution containing one or more compounds of a catalytically active precious metal, such as $Pt(NH_3)_4(OH)_2$, $RhCl_3Pt(NH_3)_2(NO_2)_2$, $Pt(NH_3)_4(NO_3)_2$, $H_2PtCl_6$, $PdCl_2$, $Pd(NO_3)_2$, $Pd(NH_3)_2(NO_2)_2$, $Pd(NH_3)_4(OH)_2$, $H_3RhCl_6$, $Rh(NO_3)_3$ and $H_2IrCl_6$. Then, the coated monolith is calcinated at a temperature preferably lying within the range of from about 300° C. to about 800° C., especially from about 400° C. to about 700° C. For preferred contents and other distinctive features, reference is made to that stated in relation to the inventive catalyst.

The invention also concerns the use of the inventive catalyst for cleaning exhaust gases from an internal combustion engine, especially a diesel engine. Cleaning is mainly performed by oxidising carbon oxide and hydrocarbons to carbon dioxide, the required oxygen generally being already present in the exhaust gases, since the engine is run with excess air. If there is no such excess, additional air may be added.

Further, the invention relates to an exhaust gas cleaning system for an internal combustion engine, especially a diesel engine, the exhaust gas cleaning system containing a catalyst according to the invention.

Finally, the invention concerns a motor vehicle having an internal combustion engine, preferably a diesel engine, to which is connected an exhaust gas cleaning system containing a catalyst according to the invention.

In the following, the invention will be illustrated by a few Examples with reference to the accompanying drawing. However, the invention is by no means to be regarded as restricted to these Examples, but naturally encompasses other embodiments conceivable within the scope of the appended claims. All the contents indicated are in per cent by weight, unless otherwise stated.

EXAMPLE 1

A catalyst A according to the invention was prepared as follows.

Silicon carbide powder having a specific surface of 25 m²/g was slurried in water and wet-ground in a ball mill so as to form a washcoat slurry having a dry content of 40%. The monolithic body used was made of cordierite and contained 62 channels/cm², the channels having a square cross-section with a side of 1 mm. The monolithic body was immersed in the washcoat slurry, and excess slurry in the channels was blown off with compressed air. Then, the monolithic body was dried and calcinated with hot air at 500° C. The coated and dried monolith was impregnated with an aqueous solution containing 27.8 g of $H_2PtCl_6$ per liter, and was then calcinated at 500° C. in air for 2 h. The resulting catalyst had a volume of 0.012 l and contained 150 g of silicon carbide and 1.41 g of platinum per liter.

For comparative purposes, a catalyst B was prepared as follows.

Active aluminium oxide having a specific surface of 140 cm²/g was impregnated with an aqueous solution containing zirconium nitrate. Drying and calcination at 600° C. in air for 2 h resulted in a washcoat containing 6% of $ZrO_2$. The washcoat was slurried in water until it had a dry content of 45% and was wet-ground. A monolithic body identical with the one used for catalyst A was immersed in the washcoat slurry, and excess slurry in the channels was blown off with compressed air. The monolithic body was then dried and calcinated with hot air at 500° C. The dried and calcinated body was impregnated with an aqueous solution containing 9.3 g of $H_2PtCl_6$ and 15.8 g of $PdCl_2$ per liter. Thereafter, calcination was performed at 500° C. in air for 2 h. The resulting catalyst had a volume of 0.012 l and contained 150 g of washcoat ($Al_2O_3$ and $ZrO_2$), 0.47 g of platinum and 0.94 g of palladium per liter.

Catalyst samples A and B were introduced into a sample holder to be exposed to exhaust gases from the same diesel engine. To shorten the test time, the additive zinc dialkyl dithiophosphate (ZDDP), common in lubricating oils, was admixed to the diesel fuel. The catalysts were exposed to the exhaust gases for 3 h, and the fuel supplied contained 22.3 g of phosphorus, 48.2 g of sulphur and 25.3 g of zinc. The running cycle appears from Table 1 below.

TABLE 1

| speed (rpm) | load (%) | time (min) | temperature (° C.) |
| --- | --- | --- | --- |
| 2000 | 30 | 30 | 275 |
| 2000 | 60 | 30 | 400 |
| 2000 | 90 | 30 | 500 |
| 2000 | 60 | 30 | 400 |
| 2000 | 90 | 30 | 500 |
| 2000 | 60 | 30 | 400 |

After being exposed to the exhaust gases, the catalyst samples were weighed and analysed by X-ray fluorescent analysis (XRF). The increase in weight, expressed as per cent by weight of the surface-enlarging washcoat layer, was 3% for sample A and 23% for sample B. According to the X-ray fluorescent analysis, samples A and B contained the amounts of $P_2O_5$, $SO_3$ and ZnO indicated in Table 2, based on the weight of the whole sample.

TABLE 2

|  | Sample A | Sample B |
|---|---|---|
| $P_2O_5$ | 0.6% | 5% |
| $SO_3$ | 0.1% | 3% |
| ZnO | 0.05% | 0.06% |

As appears from Table 2, the inventive catalyst (sample A) was much less accumulated with the ZDDP residues from the exhaust gases than was the comparative catalyst (sample B). It is also evident from the Table that sample A absorbed much less sulphur trioxide than did sample B.

EXAMPLE 2

A catalyst B1 was prepared in the same way as catalyst B in Example 1. Further, a catalyst B2 was also prepared in the same way, except that the precious metal impregnation only involved $H_2PtCl_6$, and the resulting catalyst B2 then contained 1.41 g of Pt/l. Catalysts B1 and B2 were exposed to exhaust gases from a diesel engine, as in Example 1. After 18 h, the catalyst samples were subjected to X-ray fluorescent analysis, and it was found that both samples contained the same amounts of $P_2O_5$, $SO_3$ and ZnO. Thus, this Example shows that the precious metal composition has no effect on the accumulation of inorganic residues of ZDDP.

EXAMPLE 3

A catalyst C according to the invention and a catalyst D included for comparative purposes were prepared in the same way as catalysts A and B in Example 1. By way of conditioning, the catalyst samples were exposed to exhaust gases in same way as in Example 1, except that no ZDDP was added to the fuel. Then, the catalysts were analysed for oxidation of $SO_2$ into $SO_3$ by being introduced into a flow reactor which was supplied with synthetic exhaust gases, the space velocity (flow volume divided by catalyst volume) being 65,000 $h^{-1}$ and the temperature being 400° C. The synthetic exhaust gases consisted of 200 ppm of CO, 90 ppm of $C_3H_6$, 100 ppm of $SO_2$, 1200 ppm of NO, 10% of $O_2$, 7.5% of $CO_2$ and 6.4% of $H_2O$, the balance being $N_2$. The oxidation of $SO_2$ to $SO_3$ in per cent of the $SO_2$ concentration was found to be 25% for sample C (inventive catalyst) and 80% for sample D (comparative catalyst). Thus, the catalyst according to the invention has much lower tendencies towards oxidising $SO_2$ to $SO_3$ than does the comparative catalyst.

EXAMPLE 4

A catalyst E according to the invention and a catalyst F included for comparative purposes were prepared in the same way as catalysts A and B in Example 1. Each catalyst had a volume of 4.9 l. The catalysts were enclosed in sheet-metal casings and conditioned by being exposed to diesel exhaust gases according to the running cycle in Example 1, the fuel containing 40 ppm of sulphur but no ZDDP additive. After conditioning, the speed of the engine was set at 1500 rpm, which corresponds to a space velocity in the catalyst of 45,000 $h^{-1}$. At this speed, one measured the temperature required for achieving a 50% oxidation, based on the concentration involved, of carbon oxide (CO) and hydrocarbons (HC). Catalyst E required a temperature of 215° C. for CO and 230° C. for HC, while catalyst F required 175° C. for CO and 220° C. for HC. Thus, the catalyst according to the invention has essentially the same activity in respect of oxidation of carbon oxide and hydrocarbons as does the catalyst included for comparative purposes.

EXAMPLE 5

A catalyst G according to the invention was prepared in the same way as catalyst A in Example 1. A catalyst H, included for comparative purposes, was prepared in the same way as catalyst B in Example 1, except that the impregnation with precious metals involved $H_2PtCl_6$ and $RhCl_3$. The resulting catalyst contained 1.47 g of Pt and 0.29 g of Rh. The catalysts each had a volume of 1.67 l and were enclosed in sheet-metal casings where they were aged by being exposed to exhaust gases from a diesel engine for 500 h. In operation, the load on the engine was altered every half hour, so that the temperature of the exhaust gases at the catalyst inlets alternated between about 500° C., about 400° C. and about 300° C. in the order stated. Samples from the inlets of the catalysts were subjected to X-ray fluorescent analysis. The analysis showed that the sample from catalyst G contained 0.1% of $P_2O_5$, 0.07% of $SO_3$ and 0.02% of ZnO, and that the sample from catalyst H contained 1% of $P_2O_5$, 1% of $SO_3$ and 0.03% of ZnO. Thus, the catalyst according to the invention is enriched with much smaller amounts of the analysed compounds than comparative catalyst H, these compounds largely originating from the engine oil consumed in operation.

EXAMPLE 6

A catalyst I according to the invention and a catalyst J, included for comparative purposes, were prepared in the same way as catalysts F and G in Example 5. The catalysts each had a volume of 4.9 l and were enclosed in sheet-metal casings where they were exposed to exhaust gases from a diesel engine for 4 h. The temperature of the exhaust gases at the catalyst inlets was about 300° C. The fuel consumption was 6000 g/h, and the fuel contained 0.05% of sulphur. The amount of particles emitted from the catalysts was continuously measured according to the Tapered Element Oscillating Microbalance Method (TEOM), and both catalysts emitted less particles than 0.05 µg/s at 300° C. After 4 h of operation, the load on the engine was increased, so that the temperature of the exhaust gases rose to about 450° C. and the amount of particles emitted from the catalysts increased. For catalyst I, the amount of particles emitted rose to about 25 µg/s, to be immediately stabilised. The emission of particles from catalyst J was about 60 µg/s after 2 min, and had been reduced to about 30 µg/s after 10 min. During the first ten minutes after the change of load, the particles of the exhaust gases were also collected on filter paper. Analyses of the collected particles showed that catalyst I gave a sulphate emission of 6.3 g and catalyst J gave a sulphate emission of 10.5 g. Thus, the catalyst according to the invention gave a much smaller increase in particle emission upon temperature increases than did the comparative catalyst. This improvement is probably due to a smaller degree of adsorption of $SO_2$ and $SO_3$ at low temperatures.

EXAMPLE 7

Catalysts K and L according to the invention and catalysts M, N and O, included for comparative purposes, were prepared as in Example 1 and given the compositions indicated in Table 3 below. No $ZrO_2$ formed part of the catalysts. Different amounts of silicon carbide and aluminium oxide in the percentage proportions indicated were slurried in water and wet-ground. Five different catalysts of varying silicon carbide content were prepared. All the catalysts contained 1.41 g of Pt/l. The monolithic body consisted of cordierite and was prepared as indicated in Example 1.

Catalyst samples K–O were introduced into a sample holder, where they were exposed to exhaust gases from the same diesel engine. The catalyst samples were conditioned by being exposed to exhaust gases in the same way as in Example 1, and ZDDP was added to the fuel. In operation, the load on the engine was changed every half hour, so that the temperature of the exhaust gases at the catalyst inlets alternated between about 500° C., about 400° C. and about 300° C. in the indicated order. Samples from the inlets of the catalysts were subjected to X-ray fluorescent analysis. The results regarding $P_2O_5$ and $SO_3$ are indicated in Table 3 below and graphically represented in the enclosed drawing. It is evident from the drawing and Table 3 that the tendency of the catalysts to absorb $SO_3$ and also $P_2O_5$ is considerably reduced at low contents of $Al_2O_3$, and that a catalyst containing less than 10% of $Al_2O_3$ represents a considerable improvement on prior-art catalysts, which usually contain 40% or more of $Al_2O_3$ in the washcoat layer.

TABLE 3

| | Washcoat | | Catalyst | | | |
| --- | --- | --- | --- | --- | --- | --- |
| Catalyst | $Al_2O_3$ % | SiC % | $Al_2O_3$ g/l | SiC g/l | $P_2O_5$ % | $SO_3$ % |
| K | 0 | 100 | 0 | 150 | 0.4 | 0.00 |
| L | 10 | 90 | 15 | 135 | 1.0 | 0.08 |
| M | 20 | 80 | 30 | 120 | 1.5 | 0.20 |
| N | 60 | 40 | 90 | 60 | 3.0 | 0.40 |
| O | 100 | 0 | 150 | 0 | 4.0 | 0.90 |

What is claimed is:

1. A catalyst for cleaning exhaust gases from internal combustion engines, said catalyst consisting essentially of a monolithic body having longitudinally extending, open channels coated with a discrete surface area-enlarging washcoat layer which is impregnated with an effective amount of one or more catalytically active precious metals, wherein the washcoat layer of the catalyst, in order to reduce the tendency of the catalyst to oxidise and absorb (be enriched with) sulphur dioxide, contains at least about 90% by weight silicon carbide and is substantially free from aluminum oxide.

2. A catalyst as claimed in claim 1, wherein in that the washcoat layer contains at least 98% by weight of silicon carbide, based on the washcoat layer, exclusive of the catalytically active precious metal or metals.

3. A catalyst as claimed in claim 2 wherein the catalyst contains from about 15 g to about 300 g of washcoat per liter of catalyst.

4. An exhaust gas cleaning system for an internal combustion engine, wherein the system contains a catalyst as claimed in claim 3.

5. An exhaust gas cleaning system for an internal combustion engine, wherein the system contains a catalyst as claimed in claim 2.

6. A catalyst as claimed in claim 1, wherein the catalyst contains from about 15 grams to about 300 grams of washcoat per liter of catalyst.

7. An exhaust gas cleaning system for an internal combustion engine, wherein the system contains a catalyst as claimed in claim 6.

8. An exhaust gas cleaning system for an internal combustion engine, wherein the system contains a catalyst as claimed in claim 1.

9. A motor vehicle having an internal combustion engine connected to an exhaust gas cleaning system, wherein the exhaust gas cleaning system contains a catalyst as claimed in claim 1.

10. A method for preparing a catalyst for cleaning exhaust gases from an internal combustion engine consisting essentially of coating a monolithic body having longitudinally extending, open throughchannels with a discrete surface area-enlarging washcoat layer containing one or more catalytically active precious metals, wherein, in order to reduce the tendency of the catalyst to oxidise, and absorb (be enriched with), sulphur dioxide to sulphur trioxide, the washcoat layer contains silicon carbide in an amount of at least 90% by weight, based on the washcoat layer and is substantially free from aluminum oxide.

11. The method of claim 10 wherein the catalyst is coated with from about 15 g to about 300 g of washcoat per liter of catalyst.

12. The method of claim 10 wherein the washcoat layer contains at least 98% by weight of silicon carbide, based on the washcoat layer, exclusive of the catalytically active precious metal or meals.

13. A method for cleaning exhaust gases from an internal combustion engine, which comprises contacting the exhaust gases with a catalyst consisting essentially of a monolithic body having longitudinally extending, open channels, the catalyst being coated with a discrete surface area-enlarging washcoat layer which is impregnated with an effective amount of one or more catalytically active precious metals, wherein, in order to reduce the tendency of the catalyst to oxidise and absorb (be enriched with) sulphur dioxide, the washcoat layer contains at least 90% by weight silicon carbide and is substantially free from aluminum oxide.

14. The method of claim 13 wherein the washcoat layer contains at least 98% by weight of silicon carbide, based on the washcoat layer, exclusive of the catalytically active precious metal or metals.

15. The method of claim 13 wherein the catalyst is coated with a washcoat layer in an amount ranging from about 15 to about 300 grams per liter of catalyst.

* * * * *